(12) United States Patent
Rohde

(10) Patent No.: US 7,293,726 B2
(45) Date of Patent: Nov. 13, 2007

(54) DEVICE FOR GRINDING COFFEE BEANS

(75) Inventor: Florian Rohde, Minden (DE)

(73) Assignee: Melitta Haushaltsprodukte GmbH & Co., KG, Minden (DE)

( * ) Notice: Subject to any disclaimer, the term of this patent is extended or adjusted under 35 U.S.C. 154(b) by 140 days.

(21) Appl. No.: 11/131,303

(22) Filed: May 18, 2005

(65) Prior Publication Data

US 2005/0258287 A1 Nov. 24, 2005

(30) Foreign Application Priority Data

May 19, 2004 (DE) ...................... 10 2004 024 713

(51) Int. Cl.
*B02C 19/00* (2006.01)
(52) U.S. Cl. .................. 241/100; 241/199.12
(58) Field of Classification Search ........... 241/199.12, 241/100; 99/286; 222/134, 145.7, 510, 222/548
See application file for complete search history.

(56) References Cited

U.S. PATENT DOCUMENTS

| | | | | |
|---|---|---|---|---|
| 4,971,259 | A | * | 11/1990 | Nidiffer ........................ 241/34 |
| 5,458,295 | A | * | 10/1995 | Haber et al. ................. 241/100 |
| 5,697,528 | A | * | 12/1997 | Haber et al. ................. 222/134 |
| 6,349,889 | B1 | * | 2/2002 | Sandolo ........................ 241/34 |

FOREIGN PATENT DOCUMENTS

EP 0 424 326 B1 4/1991

* cited by examiner

*Primary Examiner*—Mark Rosenbaum
(74) *Attorney, Agent, or Firm*—Venable LLP; Robert Kinberg; Kyle D. Petaja

(57) ABSTRACT

A grinding device for coffee beans includes a grinding mill and a storage container positioned above the grinding mill. The storage container includes a separating wall defining at least two compartments for different types of coffee bean. The storage container has a bottom with an opening and includes a pivoting flap that selects either a feeding of coffee beans from one of the compartments to the opening or closes the opening.

13 Claims, 2 Drawing Sheets

DEVICE FOR GRINDING COFFEE BEANS

CROSS-REFERENCE TO RELATED APPLICATION

This application claims the priority of German Patent Application No. 10 2004 024 713.7, filed on May 19, 2004, the subject matter of which is incorporated herein by reference. The disclosure of all U.S. and foreign patents and patent applications mentioned below are also incorporated herein by reference.

BACKGROUND OF THE INVENTION

The invention relates to a device for grinding coffee beans.

A coffee-bean grinding device with two supply containers for coffee beans arranged above a grinding mill is already known from European patent document EP 424 326. Each supply container has a metering chamber with a displaceable lower metering wall for supplying coffee beans from the respective supply container. This arrangement permits different types of coffee beans to be supplied to the grinding mill, but the mechanical design is very involved as a result of the different supply containers and the metering devices.

European patent document EP 424 214 discloses a metering and brewing arrangement comprising two coffee bean containers which are respectively assigned to one coffee grinding mill. The desired coffee bean variety can be selected by activating the respective grinding mill. This arrangement permits selecting the coffee-bean variety, but the configuration with two coffee grinding mills is very expensive and involved from a production point of view.

SUMMARY OF THE INVENTION

It is an object of the present invention to create a coffee bean grinding device with a simple design which makes it possible to select different coffee varieties.

The above and other objects are accomplished according to the invention by the provision of a grinding device for coffee beans, comprising: a grinding mill; and a storage container positioned above the grinding mill, the storage container including a separating wall defining at least two compartments for different types of coffee beans, the storage container having a bottom with an opening and including a pivoting flap that one of (a) selects a feeding of coffee beans from one of the compartments to the opening or (b) closes the opening.

As a result of the invention, at least two different coffee varieties can be stored in a single storage container and can be supplied to a grinding mill by means of a pivoting flap provided on the bottom which permits a corresponding feeding of coffee beans from one of the compartments. The grinding device designed in this way is particularly suitable for automatic coffee machines.

According to one exemplary embodiment, the flap is positioned pivoting on the separating wall. As a result, the grinding device has a simple design and the flap can form a component of the separating wall for the coffee selection. The flap is mounted on a shaft that extends through the storage container, thus making it possible to turn the shaft from the container outside and initiate the pivoting movement.

To prevent coffee beans from being wedged-in between flap and storage container, the flap is preferably provided with a rounded-off bottom section which can be smaller than the opening in the bottom of the storage container. For separating the two compartments, the flap is provided with an intermediate wall which can be aligned with the dividing wall inside the container when it is in a center position.

The flap is preferably provided with side walls extending perpendicular to the axis of rotation, wherein these walls prevent a flow-through between the two compartments when the flap is opened. In the selection position, the opening in the bottom toward the grinding mill must be clear. A gap can thus form between the separating wall that is fixedly mounted inside the storage container and a separating wall of the flap, wherein this gap is covered by corresponding side walls.

For a simple assembly, the separating wall can be pushed into the storage container. Additional compartments can also be provided in the storage container, such as a third compartment for ground coffee which can be connected to a channel for circumventing the grinding mill.

BRIEF DESCRIPTION OF THE DRAWINGS

In the following, the invention is explained in further detail with the aid of an exemplary embodiment and reference to the enclosed drawings.

DETAILED DESCRIPTION OF THE INVENTION

Figure 1:
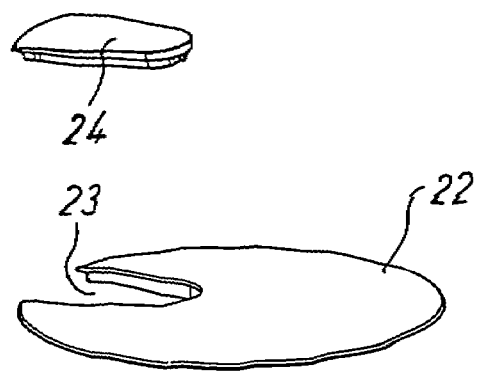
FIG. 1 is a perspective, enlarged representation of an exemplary embodiment of a grinding device according to the invention.
Figure 1:
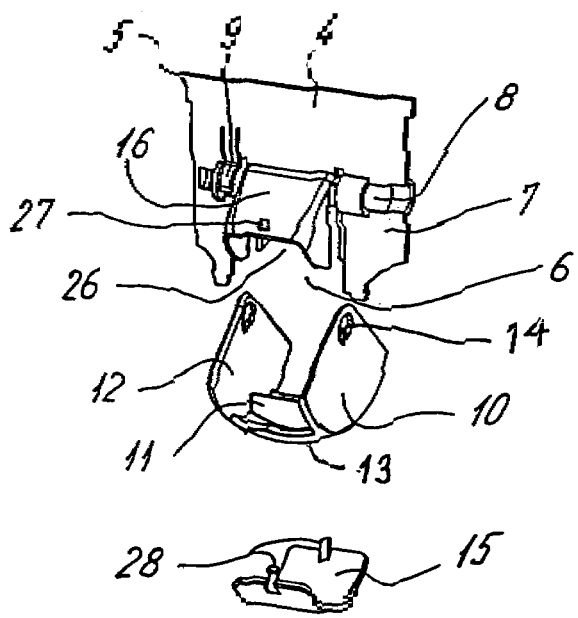
Figure 1:
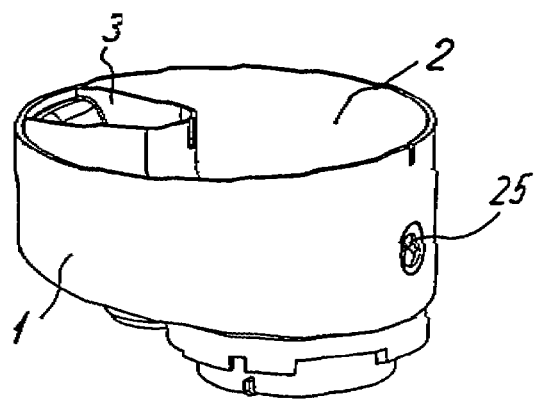
Figure 1:
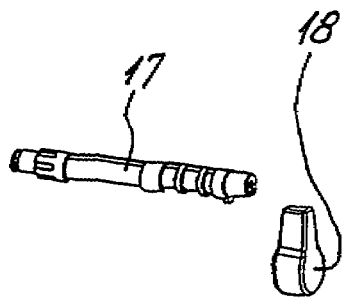
Figure 1:
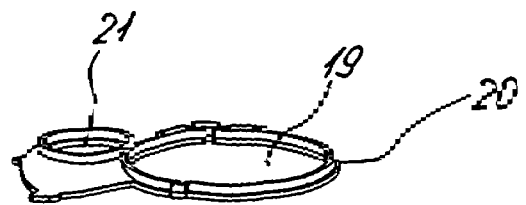
Figure 2:
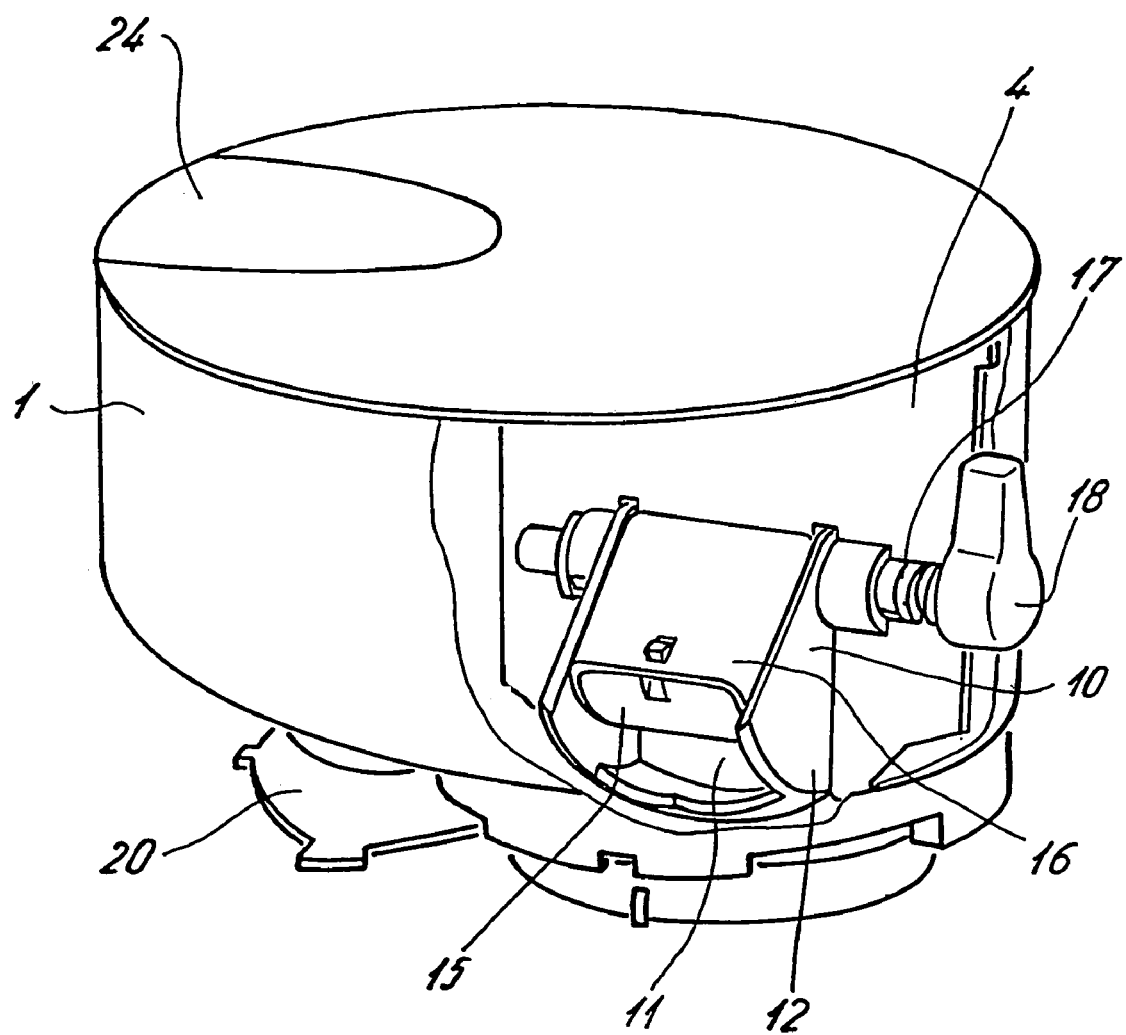
FIG. 2 is a perspective view of the grinding device shown in FIG. 1, in a fully assembled state.

Referring to FIGS. 1 and 2, there is shown a grinding device for coffee beans comprising a storage container 1, arranged above a grinding mill which is not shown therein. The storage container 1 has an inside space 2 that is separate from a compartment 3 for ground coffee. The inside space 2 of storage container 1 is divided into two compartments by a separating wall 4 which can be pushed into the storage container 1 and can be secured therein by projections 5 on the side.

The separating wall 4 is provided with a recess 6 in the lower region which is surrounded by two sections 7, one on each side. An opening 8 is provided in the section 7 shown on the right in FIG. 1 and a recessed area 9 is provided on the opposite side, wherein a shaft 17 extends through the openings 8 and 9 and can be positioned therein.

A pivoting flap 10 is arranged on the separating wall 4 for selecting the type of coffee beans to be supplied, wherein this pivoting flap has a center separating wall 11 which is aligned with the plane for the separating wall 4 when the flap 10 is in a center position. At two opposite-arranged sides, the flap 10 is provided with side walls 12 that extend perpendicular to a rotating axis of shaft 17 and from the rotating axis to a bottom section 13 of the flap 10. Walls 16 that extend at a slant downward are formed onto the separating wall 4 in the region of the flap 10, wherein these walls are designed to prevent a user from accidentally reaching from above into the grinding mill. A hollow space 26 is formed below the walls 16 and is closed off with a cover 15 which can snap into openings 27 by latching noses 28. As a result, none or only a few coffee beans can accumulate on the flap 10, immediately above an opening 19, in a center region below the separating wall 4.

The flap 10 is furthermore provided with openings 14 in the side walls 12 through which a shaft 17 extends. The shaft 17 extends through an opening 25 in one wall of the storage container 1, through recesses 8 and 9 in the separating wall 4 and the openings 14 in the flap 10. A rotary lever 18 is clamped onto an exposed end of the shaft 17 for rotating flap 10 into a desired position.

The storage container is closed off on the top with a lid 22, wherein this lid has a recess 23. The recess 23 is provided with a cover 24 which closes off the compartment 3 that contains ground coffee.

A coupling connecting element 20 is provided on the underside of the storage container which can be connected to the storage container 1 and is provided with a larger opening 19 for feeding coffee beans to a grinding mill and a smaller opening 21 for connecting to a channel that circumvents the grinding mill.

If the compartment 3 does not contain ground coffee, then coffee beans are supplied from one of the compartments formed in the storage container 1, wherein a selection is made via the flap 10. Depending on the position of flap 10, the coffee beans can be supplied to the grinding mill via the opening 19.

The invention is not restricted to the exemplary embodiment shown herein, which comprises two compartments formed by means of a separating wall 4 that can be installed and a third compartment that is arranged separately for the ground coffee. It is also possible to provide three different compartments, separated by a pivoting flap, so as to permit a selective feeding of coffee beans to a grinding mill. For this, the dimensions and shape of the storage container 1 can be adapted, for example by selecting a wedge-shaped geometry that expands toward the top.

The storage container 1 and the respective components for selecting the coffee beans that are supplied can be made of plastic to achieve a cost-effective production of the grinding device.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A grinding device for coffee beans, comprising:
a grinding mill; and
a storage container positioned above the grinding mill, the storage container including a separating wall defining at least two compartments for different types of coffee beans, the storage container having a bottom with an opening and including a pivoting flap that pivots about a pivot axis, wherein the pivoting flap one of (a) selects a feeding of coffee beans from one of the compartments to the opening or (b) closes the opening and includes side walls that extend perpendicular to the pivot axis to prevent the creation of a passage between the two compartments if the flap is in an opened position.

2. The grinding device according to claim 1, wherein the flap is positioned on the separating wall.

3. The grinding device according to claim 1, further including a shaft extending through the storage container, and wherein the flap is secured on the shaft.

4. The grinding device according to claim 1, wherein the flap includes a rounded bottom section.

5. The grinding device according to claim 1, wherein the flap includes an intermediate wall which separates the compartments from each other.

6. The grinding device according to claim 1, further including two walls extending at a slant away from the separating wall to define a hollow space above the closable opening and a bottom section of the flap.

7. The grinding device according to claim 6, further including a cover positioned to close off a bottom of the hollow space.

8. The grinding device according to claim 1, wherein the separating wall and the storage container are adapted to be pushed into the storage container.

9. The grinding device according to claim 1, wherein the storage container comprises a third compartment for ground coffee formed separately from the first and second compartments and which includes a bottom with a closable opening leading to a channel that circumvents the grinding mill.

10. A grinding device for coffee beans, comprising:
a grinding mill; and
a storage container positioned above the grinding mill, the storage container including a separating wall defining at least two compartments for different types of coffee beans, the storage container having a bottom with an opening and including a pivoting flap that pivots about a pivot axis, wherein the pivoting flap one of (a) selects a feeding of coffee beans from one of the compartments to the opening or (b) closes the opening and wherein the storage container comprises a third compartment for ground coffee formed separately from the first and second compartments and which includes a bottom with a closable opening leading to a channel that circumvents the grinding mill.

11. A grinding device for coffee beans, comprising:
a grinding mill; and
a storage container positioned above the grinding mill, the storage container including a separating wall defining at least two compartments for different types of coffee beans, the storage container having a bottom with an opening and including a pivoting flap that one of (a) selects a feeding of coffee beans from one of the compartments to the opening or (b) closes the opening, wherein the flap includes a rounded bottom section.

12. A grinding device for coffee beans, comprising:
a grinding mill; and
a storage container positioned above the grinding mill, the storage container including a separating wall defining at least two compartments for different types of coffee beans, the storage container having a bottom with an opening and including a pivoting flap that one of (a) selects a feeding of coffee beans from one of the compartments to the opening or (b) closes the opening, wherein the storage container includes two walls extending at a slant away from the separating wall to define a hollow space above the closable opening and a bottom section of the flap.

13. The grinding device according to claim 12, further including a cover positioned to close off a bottom of the hollow space.

* * * * *